March 18, 1930. J. G. FAHLSTROM 1,750,774
BOOTH FOR SPRAY PAINTING
Filed May 28, 1928

INVENTOR
John G. Fahlstrom
BY Thomas E. Scofield
ATTORNEY

Patented Mar. 18, 1930

1,750,774

UNITED STATES PATENT OFFICE

JOHN G. FAHLSTROM, OF KANSAS CITY, MISSOURI, ASSIGNOR TO BUTLER MANUFACTURING COMPANY, OF KANSAS CITY, MISSOURI, A CORPORATION OF MISSOURI

BOOTH FOR SPRAY PAINTING

Application filed May 28, 1928. Serial No. 281,077.

This invention relates to improvements in a booth for spray painting and lacquering, and refers more particularly to an inclosure in which is created an air circulation to produce the least harmful effects upon the operator and to retard, in so far as is possible, the accumulation of inflammable dust which accompanies work of this character.

The use of pyroxylin enamels and lacquers in spray painting or enameling results in a fine vapor composed of particles of the enamel and lacquer. The excessive vapor is detrimental to the health of persons using the lacquer or enamel in spray painting if the vapor produced by the spraying device is permitted to accumulate and is not rapidly removed from the vicinity of the operator. The purpose of this booth is to carry away this excessive vapor as quickly as it is formed.

The booth is preferably constructed of light galvanized sheet steel supported by a structural steel frame, and is provided with the necessary windows and doors which have been eliminated from the drawings in the interest of simplicity.

Figure 1:
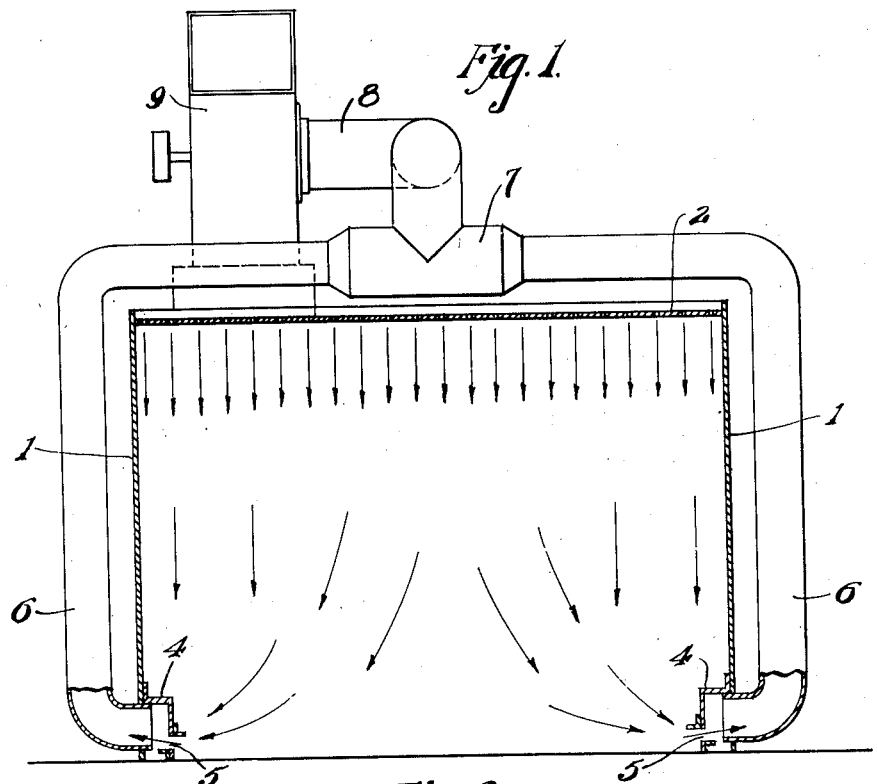
Fig. 1 is a sectional side view of the booth taken along the line 1—1 of Fig. 2 and showing the direction of air currents.
Figure 2:
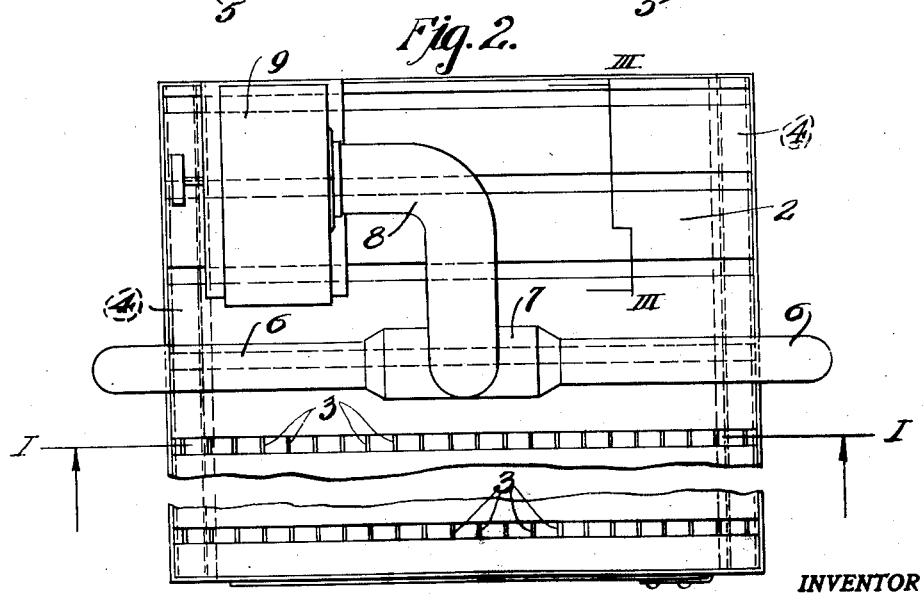
Fig. 2 is a top view with parts broken away.
Figure 3:
Fig. 3 is a view taken along the line 3—3 of Fig. 2.

The side walls 1 of the booth are of smooth galvanized steel, thus eliminating the possibility of dust accumulation. The roof 2 consists of a sheet of galvanized steel perforated in a plurality of slotted openings 3 shown in Fig. 2. These rows of slotted openings are arranged at regular intervals across the roof in order that the air admitted to the booth is supplied uniformly over the entire surface of the roof, creating a downwardly-moving screen or current of air with the elimination of secondary currents or eddies. Near the bottom of the side walls are hoods 4 which extend the entire length of the side walls and have near the floor of the booth a slot or inlet opening 5. Into the hoods are connected air ducts 6 which communicate with a common header 7 above the top of the booth. This header has a suction connection 8 to the exhaust fan 9 driven from any suitable source of power The air ducts and hoods within the booth are preferably fabricated from galvanized sheet steel so that the entire booth is fire resistant and affords little opportunity for the accumulation of dust from the spraying device. The entire booth as well as the hoods and connections may be flushed with water to prevent dust accumulation.

The exhaust fan 9 draws air through the duct 6, removing air from the booth when the windows and doors of the booth are closed and when spray painting is being done.

The operator standing in the booth has passing over him continuously a downwardly moving current of air distributed uniformly over the entire booth. The excessive vapor or spray which is not imposed upon the article, moves downwardly with this air current and passes out through inlets 5 into the exhaust duct 6. This movement of the air currents taking the spray downwardly to the discharge ducts, continuously moves the objectionable vapor away from the respiratory organs of the operator and prevents the collection and accumulation of these vapors in the upper part of the booth where they would be inhaled by the operator.

This movement of the spray vapor is facilitated by the fact that the spray is just slightly heavier than the atmosphere and the air in the booth. The even and uniform inflow of air through the roof of the booth prevents the formation of air pockets, cross currents and back eddies. The process insures a full, even and constant flow of pure air through the booth and reduces to a minimum both the injury to the operator and the danger of explosion caused by accumulation of the dust from the paint or enamel spray.

I claim as my invention:—

An enclosure for spraying fluids, having a roof with openings uniformly distributed over the surface thereof, air discharge hoods along the lateral edges of the floor of the enclosure, means for creating a suction in the hoods and withdrawing air from the enclosure and thereby creating a relatively uniform vertical air flow in the enclosure from the roof to the discharge hoods.

JOHN G. FAHLSTROM.